March 11, 1958 W. W. HERRICK ET AL 2,825,980
GRASS SEPARATING AND DRYING MACHINE
Filed March 7, 1956 4 Sheets-Sheet 1

William Wilson Herrick
James Joseph Kennedy

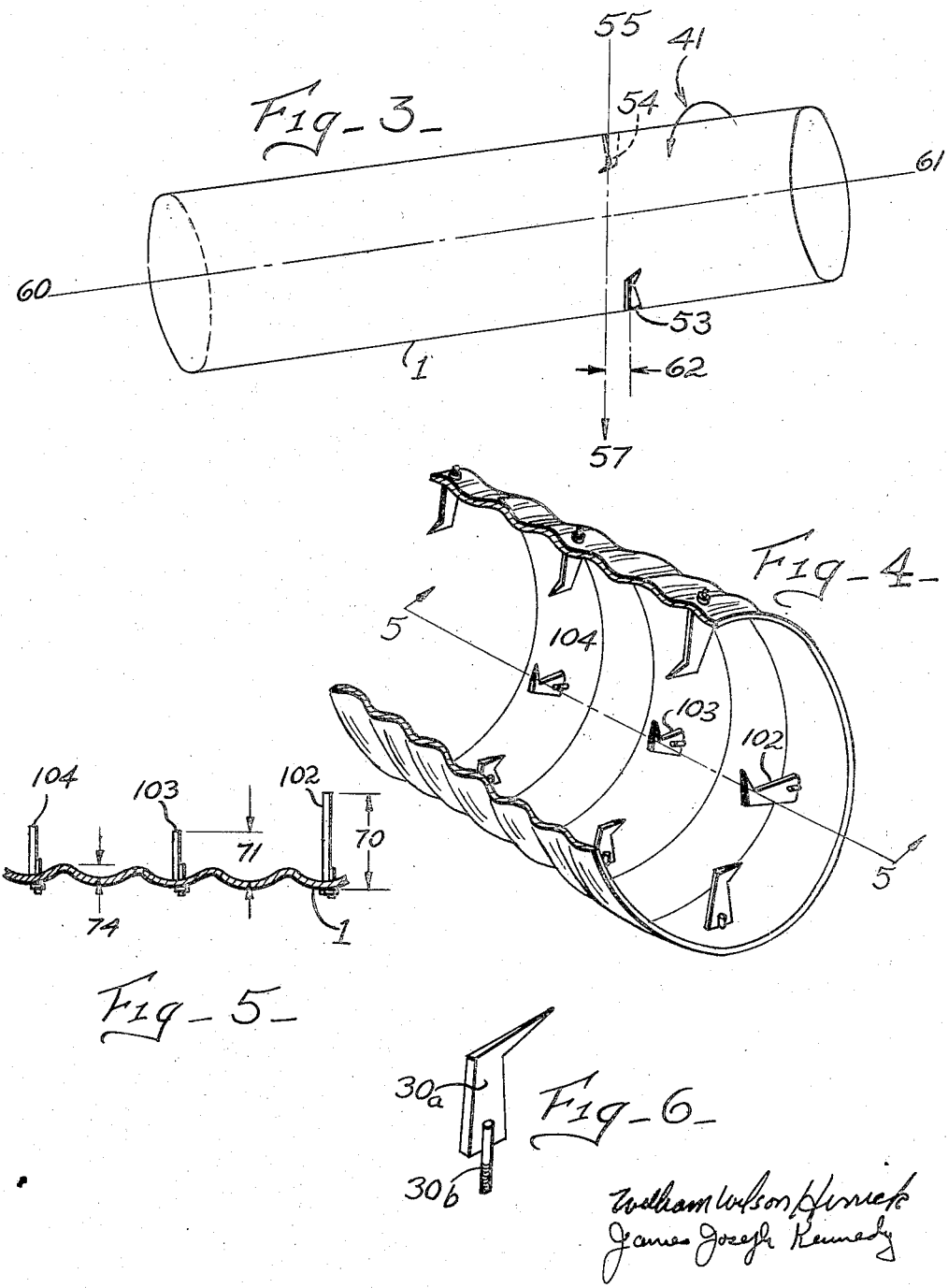

United States Patent Office 2,825,980
Patented Mar. 11, 1958

2,825,980

GRASS SEPARATING AND DRYING MACHINE

William W. Herrick, Stamford, Conn., and James J. Kennedy, Millbrook, N. Y.

Application March 7, 1956, Serial No. 570,125

3 Claims. (Cl. 34—131)

This invention relates to the improvement in hay-making or the dehydration of grasses and the preservation of natural vitamins and tender leaves suitable for cattle forage.

More specifically, the invention has to do with a machine whose principal accomplishment is the separation of long cut green grass fibers from a matted entangled mass of cut grasses to provide a means for transporting the grasses in the confines of a heated air cylinder in a loose suspended state capable of being aerated and dried.

Another accomplishment of the invention resides in that it is possible to make prime high grade hay irrespective of the weather and eliminate field drying which can only be done satisfactorily with two or more consecutive fair days.

A further accomplishment resides in that it is possible to cut and process grass at the proper stage of maturity irrespective of unfavorable weather. This factor contributes materially to the elimination of coarse overly mature stems which are low in nutrient food value.

Another particularly important accomplishment is early harvest of the first spring grasses which are particularly rich in vitamins, proteins and minerals. Lacking this invention has resulted in much waste of farm labor and potentially excellent forage. For example, since the first growth of grass is ready for cutting in late May or early June in northern latitudes and at a seasonal time when rainy periods are frequent and extended, it is almost impossible to realize a good harvest because of a lack of two or more consecutive clear sunshiny days.

It should also be emphasized that if the grasses are cut just prior to their maturing date throughout the growing season it is possible to obtain four high grade cuttings per season, rather than the normal three cuttings of considerable lower nutritional value.

As regards the general subject of long grass fiber separation and drying, we know of no machine comparable to this invention. In recent years, several types of forced hot air drying systems have made their appearance. The basic operating principles are threefold and are listed in the following:

The first general classification relates to stacking partially sun-curved hay in bins equipped with open mesh floors capable of permitting heated air to pass through the floor and into and through the partially sun-dried grass. The second approach has to do with baling partially sun-curved hay and stagger piling of said bales within a closure and then forcing heated air through the pilings. The disadvantages to the above systems are that at least one half to one full day of field drying is necessary before it is possible to undertake forced air drying. The partial field drying is a necessity because when green grass is piled or baled in a wet state, the mass weight is so great that it packs readily, making it impossible to do a drying job in a reasonable length of time. Partial field drying, except under ideal conditions, is a hazardous affair because if the moisture content is excessive in spots after baling or piling, ordinary forced air drying does not reach the damp inclusions and the grass may spoil. The third approach to the subject of grass drying relates to mechanical chopping of the grass fibers and passing the material through a form of kiln dryer. This method of processing does an excellent dehydrating job; however, the over-all end product is no longer a grass fiber but rather a coarse form of meal with very short pieces of grass stems or stubble. This material is not fit for general cattle fodder by itself but is used as an additive to elevate the nutritional value of other lower grade foods. The principal disadvantage in this form of grass processing is that cattle do not particularly like this form of forage as there is little to chew on and the short stubble stems cause mouth sores.

In the case of the grass processed by our invention, the long stems with their leaves are loosely entwined, permitting the product to be baled by conventional means and to be unbaled and fed directly to the livestock. A further point of general interest is that the grasses, whether timothy, alfalfa, rye, clover, etc., when dehydrated are all ninety percent intact, bright green in color and strong in natural fragrance. In brief, the product is a close replica to the natural full length growing substance.

Further objects and advantages will appear from the following description taken in connection with the accompanying drawings, in which:

Figure 3 is a diagrammatic drawing explaining the directional and gravitational forces brought to bear on the processed grass and the means for causing the grass to travel through the cylinder.

Figure 4 is an enlarged cut-away view of the drying cylinder exposing the spine hooks.

Figure 5 is a sectional view of Figure 4 taken on line 5—5 of Figure 4 showing the cylinder corrugations and radial reach length of the spine hooks.

Figure 6 is a perspective view of a spine hook showing the bolt fastening means.

Figures 7, 8, 9:
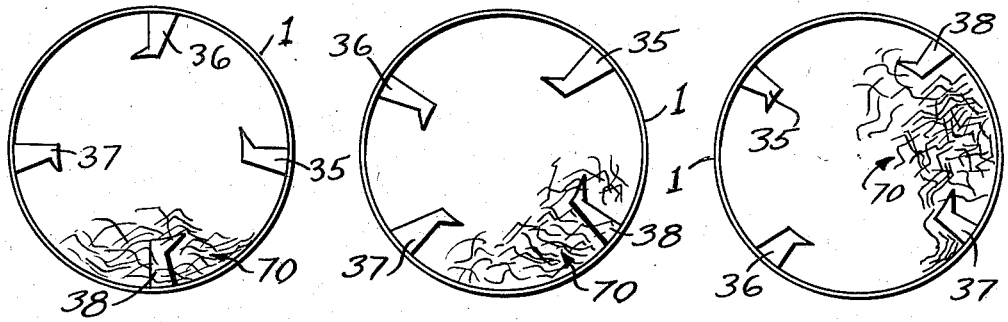

Figures 7 to and including 14 are diagrammatic end view sections of the drying cylinder 1 showing the relative action of the grasses with respect to adjacent spine hooks.

Figure 15:
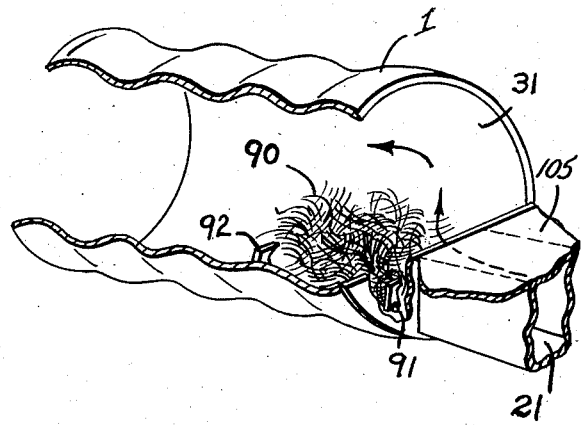
Figure 16:
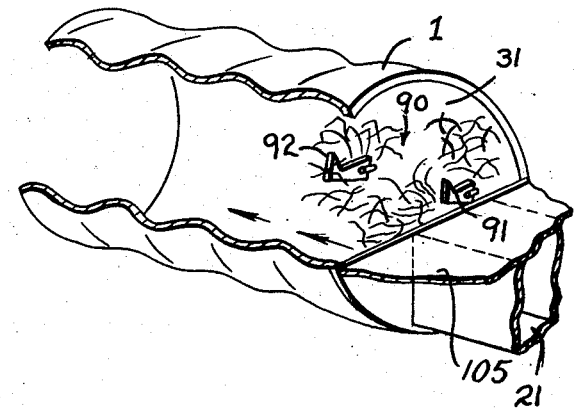
Figure 17:
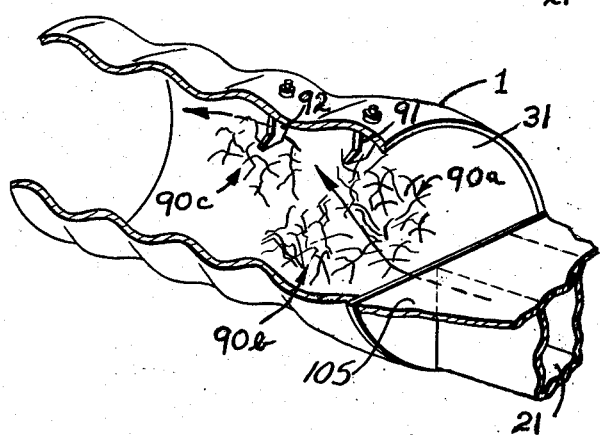

Figures 15, 16 and 17 are related diagrammatic drawings showing rupture of the grass mats between spine hooks at different rotational positions of the cylinder, also they show the relative positions of the grass mat with respect to the cylinder charge-in opening and the input air port and having to do with air flow control.

Figure 1:
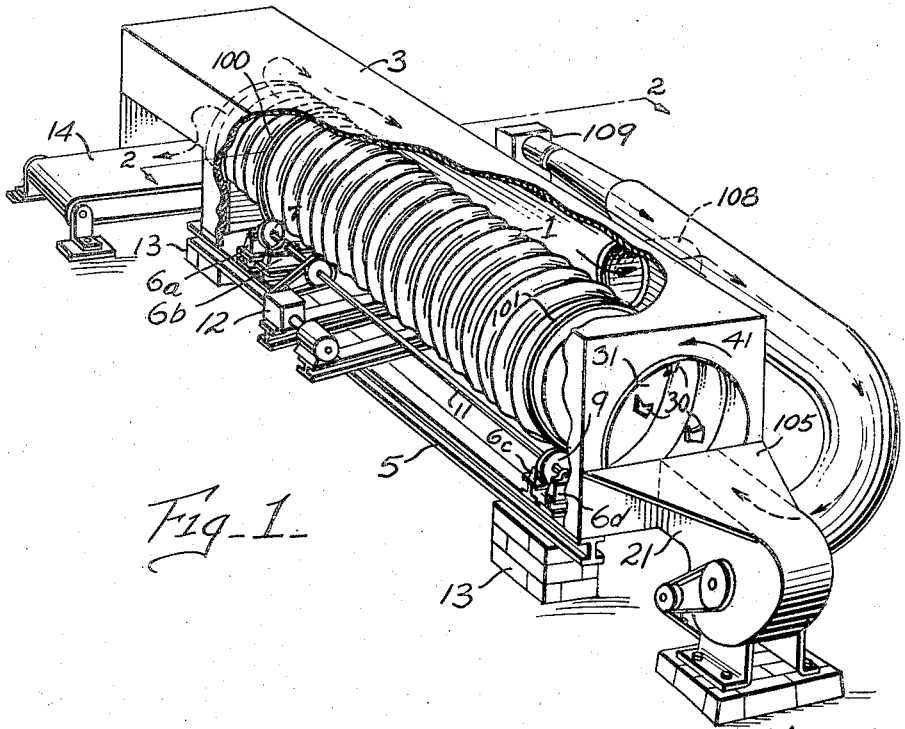
Figure 1 is a perspective view of the machine in its entirety with the housing cut away to expose the principal elements.

The general machine assembly is disclosed in Figure 1 and it entails principally a rotatable cylinder 1 with its ends open to atmospheric pressure and able to accept a charge of green grass at one end 31 and capable of discharging same at the other end on to a conveyor 14 in a dried state. The cylinder 1 is positioned on a frame base consisting of a rectangular angle iron frame 5 fitted with bearing brackets 6a—6b—6c— and 6d. These brackets carry the cylinder's rotatable driving means comprising on one side a gear reduction box and motor 12, belt driven shaft 11 and a pair of tracking friction drive wheels 7 and 9 which engage rims 100 and 101 affixed to the cylinder 1. On the opposing side resides a comparable set of supporting idler wheels. Here it is to be noted that the rotatable cylinder 1 is lodged firmly in the bite of the wheels and is held in a position out of the horizontal plane as a result of the sub-base blocks 13. The purpose of this angle or slope of the cylinder is to cause the grasses to move through the cylinder in the direction of the slope. This particular phase of the matter will be described in greater detail at a later point.

With continued reference to Figure 1, heating cylinder 1 is made from light gage sheet metal with its surface comprising a series of gentle convolutions or corrugations. The specific accomplishments of this design are: Functionally speaking, a light weight cylinder is capable of holding only a limited quantity of heat. In this regard, when moist grass comes in contact with the wall of the cylinder, heat is transferred from the wall to the grass and dehydration takes place at an accelerated rate to the extent of the heat content of that portion of the metal cylinder coming in contact with the grass. Now, since the air temperature entering the cylinder at the charging end 31 is in excess of the scorching point of dry grass, 450° F. to 500° F., it is understandable that the cylinder is also in that temperature range and is capable of rapid heat exchanging due to its comparatively high specific heat of conductance. More specifically, it will now be understood that if an excess heat supply is available to be transfererd due to excessive mass in the cylinder, then portions of lighter grass fibers will be dried to completion and scorched in the first stages of being processed. This condition is eliminated because of the reduced quantity of heat held by the thin cylinder wall. The light gage metal cylinder adds further to the usefulness of the device in that it can be brought up to heat in a short length of time and at a reduction in fuel cost. The corrugations provide for improved mechanical rigidity and when gentle radial convolutions make up the corrugations as is the case, the duct is 100 percent self-cleaning, entrapping no particles of grass.

A still further important attainment in the corrugations resides in that the grass mats lying on the bottom portion of the cylinder receive air circulation via the depressed portion of the convolutions. See Figure 5, dimension 74.

Referring back to Figure 1, it will be noted that the inner periphery of cylinder 1 is fitted with a pattern of hook shaped spines generally noted by 30. The purpose of the spines is to engage masses of entangled grasses entering the charging open end 31 of cylinder 1. Here it will be easily understood that when the cylinder 1 rotates, the spine hooks 30 engage and impale masses of the grass and carry portions of same in a radial path about the axis of rotation of cylinder 1. The spine hooks 30 are positioned with their piercing ends pointed in the direction of the rotation of cylinder 1, indicated by arrow 41. The hook portions of the spines are angularly inclined substantially at right angles to the radius of cylinder 1. In this regard, the grass impalements gravitationally fall free from the spines when the upper range of the duct is reached. See Figure 6 for construction arrangement of the spine hook where 30a is the hook portion while 30b is a threaded shaft electrically welded thereto and where the assembly may be bolted to cylinder 1.

Figures 13, 14:
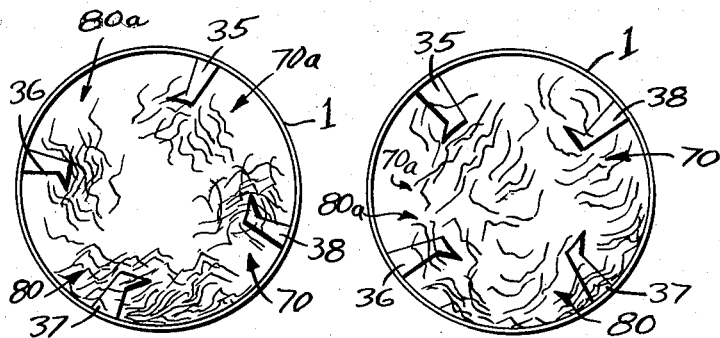

Referring now to Figures 7 to and including Figure 14, a better understanding will be had of the subject of impalement and gravitational falling of the grass. The above referred to figures are diagrammatic relating to an end view of cylinder 1 and showing four opposing spine hooks referred to as item 30 in Figure 1 and now referred to as 35, 36, 37, and 38. More specifically, each of the figure drawings 7 to 14 inclusive represent progressive degrees of rotation of the cylinder 1 while charging grass into same. By a careful study of each of the drawings in conjunction with the following description, a clear understanding will be had of how the grass fibers are separated from each other permitting the passage of heated air which accomplishes dehydration.

Figure 7 shows the first mat of grass indicated by 70 charged into the machine and impaled on spine hook 38.

Figure 8 shows the cylinder 1 progressively rotated in a counter clockwise direction with the grass impalement in the process of being elevated.

Figure 9 shows grass mat 70 about to fall under the influence of gravity off spine hook 38 with a portion of the mat engaging the trailing spine hook 37.

Figures 10, 11, 12:
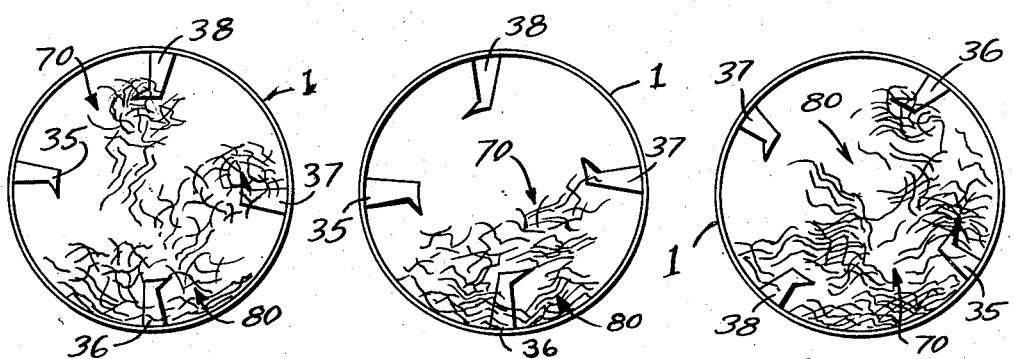

Figure 10 is similar to Figure 9 but here a second mat of grass 80 has been charged into the machine just prior to the gravitational fall of grass mat 70. Of particular importance, it should be noted that spine hooks 37 and 38 have engaged grass mat 70 near the end extremities leaving the more massive proportions unimpaled and free to become dislodged.

Figure 11 illustrates this dislodgement completed and where the mat of grass has been turned over.

Figure 12 is a view taken later than Figure 11 and where an end impaled portion of grass mat 80 is commencing to break away from spine hook 36 to form a second mat.

Figure 13 is a later stage of rotation of the cyilinder 1 and where mat 80 has broken down into two portions 80 and 80a. Here it will be noted that mat 80 falls and becomes impaled on spine hook 37 while small mat 80a progresses radially past the top dead center of the cylinder 1. At this same time it will be noted that a part of mat 70 has broken away to form another small mat 70a. By referring back to Figure 12 it will be noted that grass mat 70 has been impaled by two spine hooks 35 and 38. Also it will be noted that grass mat 80 has fallen on the unsupported bridged portion of grass mat 70 which aids the mat to break up into two portions 70 and 70a as shown in Figure 13.

Figure 14 is a continuation of the above processes and where the respective grass mats are further subdivided and separated. Of particular importance it will be noted that as the grass mats become broken down into smaller units, the cross sectional appearance of the cylinder 1 is one of grass in a state of aerated suspension. This condition must be satisfied in order to uniformly dehydrate the fibers in a reasonably short period of time and yet not overheat or burn the tender leaf portions.

Now that a general understanding has been had as to the principles involved in the grass separation, it is necessary to further enlarge upon other features which if absent render the mechanism unsatisfactory. The following will clarify this matter:

Referring to Figure 5, the subject of spine hook reach will be understood; it is the radial distance the spines extend from the periphery of the cylinder 1. Here it will be noted that spine hook 102 has a reach length 70 and is substantially greater than spine hooks 103 and 104 whose reach length is 71. Practically speaking, spine hook reach governs the maximum depth of grass impalment. In this regard, if adjacent spines are varied in reach length a variation in grass pick-up results. Also, it will be noted that a short reach spine hook will release the grass under the influence of gravity prior to reaching the upper portion of the cylinder while longer reach spine hooks will carry grass up to and sometimes beyond top center. This factor contributes to separating and sub-dividing the grass mats along the lines of the disclosures shown in Figures 7 to 14 inclusive.

The matter of spacing between spine hooks if not properly understood will cause long length grass fiber clusters to become matted and hopelessly balled and rolled together with adjacent clusters of grass. This action is quite similar to what takes place in a conventional tumbling barrel when processing a large quantity of materials that have projections, snags and the like that can be tumbled into locking interference. This action causes the growth of a few large masses of material which move relatively to the barrel or cylinder, therein defeating the purpose of the operation. To overcome the above ill effect as applied to grass separating, it was discovered that the spacing of the spine hooks in the cylinder had to be positioned to cause the occurrence of the following: The mass weight of the unimpaled unsupported grass mat or cluster between the spine hooks has to rupture and break apart leaving the impaled portions to be carried to the upper area of the duct where the angular portion of the hook alters its position to free the grass to fall.

Figures 15, 16 and 17 illustrate this condition by way of perspective schematic diagrams. In this regard, these drawings, for simplification, show only two spine hooks and their action on a single mat of grass at different stages of rotation. Figure 15 shows a single large mat of grass 90 impaled by spine hooks 91 and 92. Figure 16 is a view of Figure 15 taken after the cylinder has revolved about ninety degrees and where the unimpaled portion of grass 90 has sagged under its own weight between the impaled end portions. Figure 17 is a view taken ninety degrees later than Figure 16 and where grass mat 90 has ruptured, dividing the grass mat into three portions 90a, 90b, and 90c. If the grass mat were not caused to rupture and subdivide it would tend to roll and wad. The principal governing factor is the distance spacing of adjacent spine hooks. Experience to date indicates that this distance should be not less than the sum of the combined radial reach length of adjacent spine hooks.

Regarding the diameter of the cylinder, the minimum limiting size is governed first, by the maximum cut length grass fibers to be processed per unit of time. From a practical standpoint most grasses are cut before maturity and average about two feet in length. This grass length of two feet when cut and piled in a wet state by conventional means becomes significant to the extent that when it is unpiled by hand forking or mechanical unloading means, tends to form clusters not greatly exceeding a cube two feet on each face. In this regard, it is this mass or grass that is subject to being separated. Quite obviously, a cylinder diameter capable of accepting a cube two feet on each face would have to have a diameter capable of encompassing the grass mat girth with an added allowance for the reach length of the spines plus a still further allowance for dividing and separating the grass clusters; additionally more space must be provided for a gravitational fall. In brief summary, a practical working machine should have a five foot diameter cylinder filled with spine hooks having a reach length of about twelve inches and not less than four inches.

Progression of the grass through cylinder 1 is best understood by referring to Figure 3 which is a schematic diagram showing the relative path of a single spine hook mounted in the cylinder with respect to the axis of rotation of cylinder 1 and the forces of gravity. For simplification purposes the rotatable cylinder 1 is shown with a spine hook in two positions; item 53, in solid lines, at the bottom of the cylinder 1 and in the impaling position, and item 54, in broken lines, at the elevated position where the gravitational fall takes place. From this it will be understood that any grass falling freely from hook position 54 must fall on gravitational line 55 and 57. Since cylinder 1 is positioned with its axis of rotation out of the horizontal plane to form a slope, reference line 60—61, it follows that the increment of grass travel through the cylinder will be approximately equal to distance 62 or the component effect brought about by the slope of the cylinder with respect to gravitational line 55—57.

Figure 2:
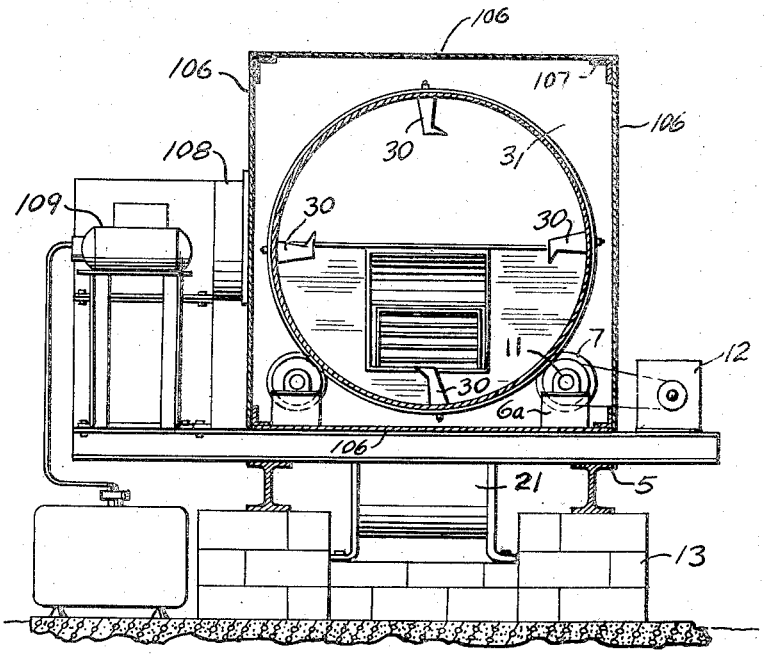
Figure 2 is a sectional drawing taken on line 2—2 of Figure 1 viewing the blower discharge port, oil burner, fuel tank and cylinder driving means.

Details concerning the arrangement for supplying heated air are best illustrated by referring to Figures 1 and 2. Here it will be noted that rotatable cylinder 1 is positioned in alignment with the discharge end of a conventional hot air blower 21 whose upper exhaust structure forms a grass loading deck 105. The discharge end of cylinder 1 is positioned within the confines of a hot air return housing 3 which is provided for transporting the dehydrated grass to a baling machine or storage bin. Housing 3 is composed of a plurality of panels 106 screw fastened to angle irons 107. More particularly it will be noted that the hot air return housing 3 is connected to a return hot air duct 108 which leads to the vacuum side of blower 21. In this regard, sub-atmospheric pressure is maintained within cylinder 1 causing the heated air leaving blower 21 to readily enter cylinder 1. Means for heating the air offer several possibilities depending upon the availability of energy at the particular time or installation site. Our particular machine is equipped with a high pressure gun-type direct fired oil burner 109 which produces an air temperature of 400–600° F. at the charging end 31 of cylinder 1. These comparatively high temperatures readily bring the wet green grasses up to heat, promoting rapid dehydration. Of particular interest it should be noted that these high heats do not cause scorching due to the fact that the grass remains only a few moments in the immediate vicinity of the hot input air zone due to the action of the spine hooks previously described.

Additionally it will be noted that all grasses charged into the duct must first fall directly into the path of maximum heat. This arrangement permits the partially dried grass already in process to be shielded against scorching.

By referring again to Figures 15, 16 and 17 a clear understanding will be had. Figure 15 portrays a mat of grass 90 charged into cylinder 1 and substantially closing the outlet blower 21 and absorbing heat. In this position grasses processed prior thereto and further advanced in the process would be protected for a portion of the cycle until rotation of the cylinder had progressed to the extent that the grass is dislodged as in Figure 16. In addition to the above, a further important accomplishment is achieved and is described in the following as pertaining to Figures 15, 16 and 17. In this regard, as mats of grass are charged into the cylinder, they are impaled and elevated to the upper open diameter of the cylinder where they fall and form a valve or screen substantially closing the opening 31 to the escape of heated air being discharged from blower 21. Grass mat 90a in Figure 17 is shown partially closing the cylinder opening 31. Under field operation, this action is continuous, therefore, it will be understood that the hot air stream flow is alternately increased and reduced, deflected toward the upper extremities of the cylinder and to the lower extremities as a result of grass mat impalement and displacement. The directional arrows in Figures 15, 16 and 17 relate to air flow. The end result of this form of grass separation renders it possible to reduce air resistance within the cylinder and through the grass fibers to the extent that large volumes of air can be re-circulated at low velocities and in the range of 15 to 20 miles per hour. The achievement of low air velocity prevents blowing the grass fibers down the running length of cylinder 1 prior to drying. Despite the fact that air velocities within the cylinder have been kept as low as possible and in keeping with the volume flow necessary for the dehydration operation, it has been found that small to medium size clusters of grasses which break away from the grass mat tend to be carried through the inclined cylinder at accelerating rates of speed. In opposition to this effect, the cylinder corrugations when placed at right angles to the flow of the grass causes a wash-board effect of sufficiently high sliding coefficient of friction to brake this forward motion. The large volume air flow renders it possible to re-circulate up to 75% of the heated air and limiting the relative humidity to 50% to 75% just prior to exhausting same. Operating in this manner insures continuous dehydration throughout the length of the cylinder. In order to thoroughly understand the full meaning and implication of recirculating the humid products of dehydration, the following is now offered: For example, by referring back to column 3 line 17 a better appreciation will be had for the existing physical conditions and the effects of high temperature. Up to this point, only the more obvious functions have been described, and where, from here on, the less obvious requirements and accomplishments are set forth.

Since the majority of grasses to be processed will contain alfalfa, a very rigid set of specifications is automatically imposed upon the dehydrator if success is to be achieved. For example: Alfalfa has a tough bulky stem supporting delcate vine-like leaves and which require large quantities of heat to penetrate the bulky stem portions and at the same time requires temperatures sufficiently low as not to damage the delicate portions. In this regard, a solution to the problem becomes evident in recirculating a large portion of the waste products of dehydration. In actual practice it was found that by reheating the evaporated moisture and converting same to superheated vapor it was possible to maintain a process temperature of 400° F. to 500° F. and at the same time greatly increasing the heat energy of the recirculating gases which impinge upon the grass fibers. It also should be pointed out that if the processing input air to the cylinder is in the above temperature range and lacking in superheated vapor, a reduced heating effect results causing the stem portions of the grasses to be dried only on the surface yet the tender leaves will be overly dried or scorched. The over drying of grasses is not only detrimental to the nutritional values but causes embrittlement and where the leaves shatter falling free from the stems and are blown down the cylinder in the form of chaff, and, hence, are not in a baleable form.

The matter of preventing scorching of leafy portions by way of recirculating the waste products of combustion and dehydration are best understood by bearing in mind that the grass enters the process in a cold, wet state. Under this condition when the superheated vapor contacts the grass the following takes place:

(1) The grass absorbs heat from the superheated vapor with moisture being extracted from the grass.

(2) The lowered temperature of the superheated vapor in combination with the effects of water absorption from 1 above, renders a mildly humid atmosphere high in heat value but carrying sufficient moisture to prevent complete dehydration and scorching of the tender leaf portions.

The structural arrangement as described earlier can now be better appreciated in light of the characteristics of the material to be processed. For example: By referring back to Figure 1 it is now possible to trace the path followed by the recirculated gases and to fully understand the progression of events. Basically fresh make-up air enters the system at 31 close to the deck line at 105 through air injeciton principles caused by the high velocity of the hot gas coming from the positive pressure side of the blower 21. The hot gases of combustion and dehydration mix with small percentages of fresh make-up air which then contacts the wet green grass charged into the entrance of the cylinder. The gas mixture absorbs water from the grass and expands creating a localized positive pressure condition within cylinder 1, the net effect of which is to force the expanding gas out through the two open ends of the cylinder. Since cylinder end 31 is substantially closed off to the atmosphere by way of the grass curtain (see column 6, line 33), the general directional travel of the expanded gases is toward the discharge end of the cylinder in the vicinity of conveyor 14 and its surrounding ports. Particularly it will be noted that the negative pressure side of the blower 21 is directly communicable with the discharge end of the cylinder. In this regard the negative pressure effect is for the blower to suck back into the system a maximum of the products of dehydration and where the gas volume sucked back is a direct function of the capacity of the blower. Furthermore, the end products of dehydration within the cylinder upon expanding causes the gas to be crowded into the negative pressure side of the blower and where the excess volume over and above the capacity of the blower is displaced out of the grass exit port and lost in the atmosphere.

Having described the invention, what is claimed as new is:

1. A grass separating and drying machine comprising a support, a laterally corrugated drum having an open inlet end and an open outlet end, a plurality of spaced spine hooks of varied radial length mounted on the inner surface of said drum, said spine hooks comprising a piercing point extending substantially at right angles from the free end of a radially mounted plate, a blower having an inlet and an outlet, first duct means connecting said blower outlet to said inlet end of the drum, wet material feed means at said inlet end of the drum, an atmosphere air inlet at said inlet end of the drum, a housing enclosing and in communication with said outlet end of the drum, said housing having a discharge opening whereby dehydrated grass and a portion of the recirculating gases are discharged to the atmosphere, a second duct means communicating with said housing and connected to said blower inlet whereby a portion of the gases discharged from the drum are recirculated, and heating means pneumatically communicating with said blower for heating the recirculating gases.

2. A grass separating and drying machine comprising a support, a laterally corrugated drum rotatably mounted on said support, said drum having an open inlet end and an open outlet end, a plurality of spaced spine hooks of varied radial length mounted on the inner surface of said drums, each spine hook having a piercing pointed portion at its free end extending at right angles thereto, a blower having an inlet and an outlet, first duct means connecting said blower outlet to said inlet end of the drum, wet material feed means at said inlet end of the drum, an atmospheric air inlet at said inlet end of the drum, a housing enclosing and in communication with said outlet end of the drum, said housing having a discharge opening whereby dehydrated grass and a portion of the circulating gases are discharged to the atmosphere, second duct means communicating with said housing and connected to said blower inlet, whereby a portion of the gases discharged from the drum are recirculated, and heating means associated with said second duct means for heating the recirculating gases.

3. A grass separating and drying machine comprising a support, a laterally corrugated drum rotatably mounted on said support, said drum having an open inlet end and an open outlet end, a plurality of spaced spine hooks of varied length mounted on the inner surface of said drum, each spine hook having a piercing pointed portion at its free end extending at substantially right angles thereto, a blower having an inlet and an outlet, first duct means connecting said blower outlet to said inlet end of the drum, wet material feed means at said inlet end of the drum, an atmospheric air inlet at said inlet end of the drum, a housing enclosing and in communication with said outlet end of the drum, said housing having a discharge opening whereby dehydrated grass and a portion of the circulating gases are discharged to the atmosphere and where the relative positioning of said discharge opening in said housing is beyond the discharge end of the drum, second duct means connecting with said housing back from the open outlet end of said drum and communicating with said blower inlet whereby a portion of the gases discharged from the drum are recirculated, and heating means pneumatically communicating with said blower for heating the recirculating gases.

References Cited in the file of this patent

UNITED STATES PATENTS

| | | |
|---|---|---|
| 1,262,416 | Warrick | Apr. 9, 1918 |
| 2,079,280 | Couch | May 4, 1937 |